May 26, 1936.  R. A. BEDFORD  2,042,088
DRILL SHAFT AND BIT ADAPTED TO BE USED WITH PERCUSSIVE DRILLS
Filed May 6, 1935
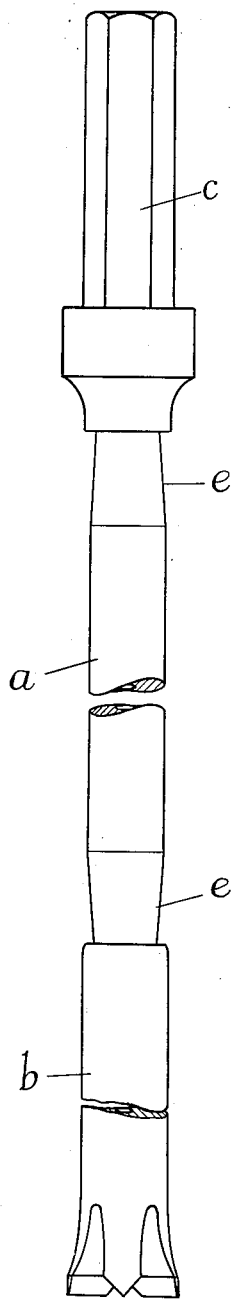
Fig. 1
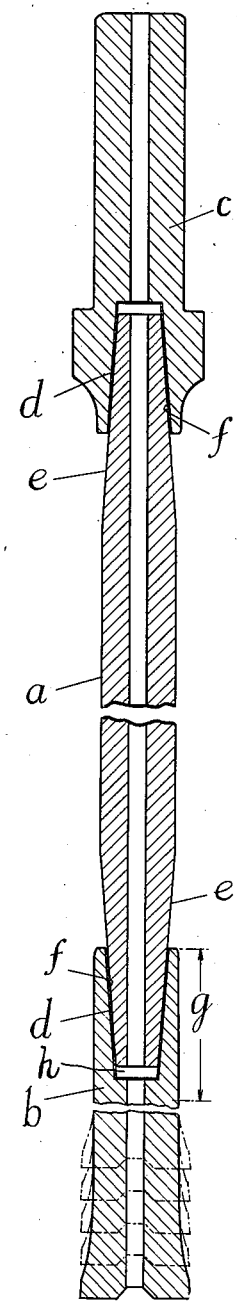
Fig. 2
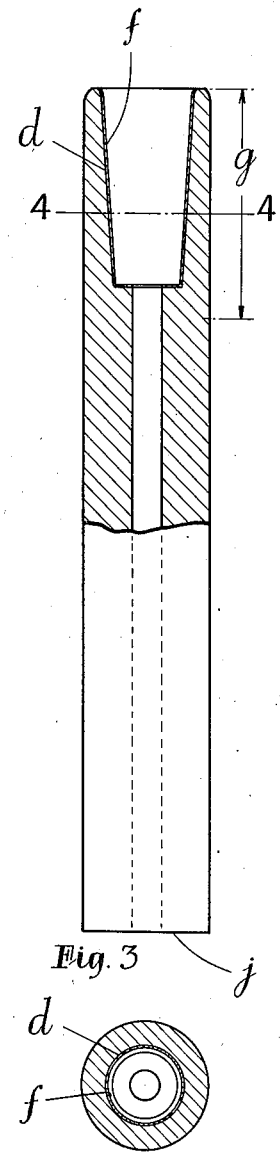
Fig. 3
Fig. 4
Inventor
REGINALD ASLINE BEDFORD,
BY
Toulmin & Toulmin
Attorneys Patented May 26, 1936

2,042,088

UNITED STATES PATENT OFFICE 2,042,088

DRILL SHAFT AND BIT ADAPTED TO BE USED WITH PERCUSSIVE DRILLS

Reginald Asline Bedford, Sheffield, England

Application May 6, 1935, Serial No. 20,061
In Great Britain September 26, 1934

7 Claims. (Cl. 255—64)

This invention relates to drill shafts, bits, adaptors or other connectors adapted for use with drills of the percussive type.

It has hitherto been the practice in manufacture to form the drill shaft and drill bit separately and subsequently attach the bit to the shaft by means of a plug and socket joint, whereby the bit when worn may be removed from the drill shaft and replaced by a fresh bit without the necessity of materially interrupting the drilling operation. Further, at the opposite or anvil end of the drill shaft it has been found advantageous to fit the drill shaft into an adaptor by similar means, thus making it possible to change the drill shaft for one of longer or shorter length according to practical requirements.

In my prior Patent No. 1,941,289 I have described a rock drill shaft and bit or adaptor connected together by a plug and socket joint having interposed between the co-operating surfaces of the joint a thimble formed of a layer of relatively soft metal and acting as a cushioning member. This thimble is generally of truncated conical form and is either made separately from, and subsequently inserted in, the socketed member, or alternatively is cast direct into the socketed member.

It is not practical, however, to form such thimbles with other than relatively thick walls nor to make them fast upon or adherent to the wall of the socket as to be resistant to movement and consequently there is a substantial thickness of relatively soft metal which, under percussive stress becomes compressed by the plug which consequently "creeps" into the socket with the added result that the thimble becomes distorted and the metal thereof partially extruded and after a very short period of use the plug tends to seat itself on the hard metal of the socket, thus eliminating any cushioning action and resulting in local stresses being set up. Furthermore, should the wall of the socket become bared by extrusion of the thimble and the plug make contact with said wall, this results in scoring of the surface of the plug owing to the action of the hard metal of which the socket is composed.

These disadvantages arise both when the thimble is used in association with an adaptor, or with a drill bit and are apparently due to the fact that the thimble is not made permanently fast upon or closely adherent to its associated member as to resist removal as a whole.

Further, as a result of the before-mentioned "creep" and stresses, the wall of the socket of the bit becomes ruptured and enlarged and although in the case of the adaptor the wall of the socket can be strengthened by being made of substantial thickness and by being formed or provided with a strengthening collar or enlargement, in the case of a drill bit, the size of the cutting end of the bit limits the outside diameter of the wall of the socket owing to the clearance required for said cutting end. It is not practical, therefore, to strengthen the bit after the manner of the adaptor and for this reason the socket when enlarged cannot be fitted with a new thimble to take the plug again thus rendering the bit unsuitable for further use were it made long enough to be re-sharpened. In consequence of the foregoing disadvantages only a very short length of bit is used in order to avoid as far as possible unnecessary expense in the waste of material, since the bit is thrown away immediately rupture of the parts prevents its further correct fitment upon the plug.

The object of the present invention is to provide improvements wherein the before-mentioned disadvantages are avoided, and wherein a longer length of bit may be used thus permitting it to be repeatedly removed, re-sharpened and refitted to the plug without the necessity for a new thimble, thus giving the bit a longer working life, resulting in economy both of time and material.

The present invention accordingly consists in drill shafts, bits and adaptors or other connectors adapted for use with drills of the percussive type and involving the use of plug and socket joints, wherein the manufacture of the socketed member includes the following steps, first forming the said member as a hard metal body and subsequently providing the inner wall of the socket with a layer of softer metal by electro-deposition, spraying or brazing as a result of which the said layer of softer metal is in such physical association with the metal of the said member that it is intimately allied thereto or integral therewith.

The layer may be constituted by a simple open-ended layer or may be formed with its lesser diameter substantially closed, except when it is necessary to provide an opening for the passage of fluid for clearing débris away through a hollow drill shaft.

The invention also consists in the manufacture of a socketed member according to the penultimate paragraph which includes the step of hardening and tempering at least that end of the member formed with the socket whereby the wall of the socket will be inherently resilient and thereby return to its normal size after being expanded by the plug, the layer, owing to its being permanently adherent or integral, functioning with the socket under the varying conditions without being ruptured or extruded over a long period whereby a perfect fit is ensured between the parts, the layer acting as a cushioning member to take up the stresses due to the percussive action of the piston or other member operating on the drill shaft. The plug can therefore uniformly engage and re-engage the socket and the degree of grip be maintained so that the bit can be uniformly disengaged from and re-engaged with the work. The permanent adherence of the layer and its retention over a long period also prevents the plug from bearing against the hard metal of the socket, thus preventing the scoring of the surface of the plug which is caused when said plug comes into contact with the bared wall of the socket which, in the case of the bit, is of very hard metal.

In the case where the invention is applied to the plug and socket connection between the bit and drill shaft, the bit can be made longer than has hitherto been the practice, thus enabling the drill bit to be removed from the drill shaft and the end of the bit reheated and reformed, sharpened and again hardened and used repeatedly upon the plug without the necessity for a new layer, the bit being eventually discarded only when worn down to such a short length that it cannot be used further.

In practice I have found that the layer may be electrolytically deposited as a relatively thin layer of metal, e. g., copper, approximately 0.005 inch thickness and although it has been found suitable with drill steels of about ⅞" diameter it will be understood that the invention is not limited to this particular thickness.

I have found that with such a layer it is possible to provide a length of drill bit to permit of being re-sharpened approximately twenty times and that the socket and layer of such a bit withstood the stresses of drilling twenty-one holes, each four feet in length in Mount Sorrel granite at the rate of approximately ten inches per minute after each sharpening using seventy-five pounds air pressure.

The invention also is not limited in the particular metal used for forming the layer, as in some cases I may find it more advantageous to form the layer by applying a layer of nickel or any other suitable metal or alloy capable of being applied as before-mentioned. The free edge of the socket may be rounded to facilitate the entrance of the plug.

Referring to the drawing filed herewith:

Fig. 1 is an elevation illustrative of one form of rock drill made according to this invention;

Fig. 2 is a longitudinal section of same;

Fig. 3 is an elevation to an enlarged scale and partly in longitudinal section of a metal blank from which the detachable bit of the drill is made;

Fig. 4 is a cross section on the line 4—4 of Fig. 3.

In Figs. 1 and 2 $a$ is a hollow drill shaft, $b$ the axially holed detachable bit and $c$ is an axially holed adaptor by means of which the drill receives percussive action from the usual type of machine into which the drill is fitted through the medium of said adaptor. Both the bit $b$ and the adaptor $c$ are formed with a taper socket $d$ for receiving the taper ends $e$ of the drill shaft $a$ and the layer of soft metal upon the inner wall of each socket $d$ is indicated at $f$ and for the sake of clearness its thickness is somewhat exaggerated. The socketed end of the bit has been hardened and tempered where indicated at $g$ so that the wall of the socket is inherently resilient.

It will be observed that the fitment of the drill shaft $a$ in the socket of the bit is such that a gap $h$ is left between the extremity of the shaft and the bottom of the socket to ensure correct fitment and when the wall of the socket is expanded by the "creep" of the shaft, the layer $f$ on the bottom of the socket can form a cushioning abutment for the extremity of the shaft. On removal of the bit from the shaft the wall of the socket returns to its normal size owing to its inherent resilience.

Figs. 3 and 4 illustrate a bit blank, the butt end $j$ of which is subsequently sharpened, the socketed end $d$ being hardened and tempered at $g$ prior to the electro-deposition of the soft metal layer $f$.

What I claim and desire to secure by Letters Patent is:—

1. In a rock drill, a detachable bit comprising an axially holed relatively hard metal stock formed with an enlarged drilling or cutting end and a taper socketed other or opposite smaller end adapted to receive the tapered end of an axially holed drill shaft and a relatively soft metal axially holed tapered comparatively thin liner of uniform thickness located non-extrudibly between the parts and physically associated with the inner wall of said socketed end so as to be integrally attached thereto and to function therewith devoid of movement relative to its associated wall during movement of the shaft relative to the bit.

2. In a rock drill, a detachable bit comprising an axially holed relatively hard metal stock formed with an enlarged drilling or cutting end and a taper socketed other or opposite smaller end adapted to receive the tapered end of an axially holed drill shaft and a relatively soft metal axially holed tapered comparatively thin liner of uniform thickness located non-extrudibly between the parts and electrolytically deposited upon the inner wall of said socketed end so as to be integrally attached thereto and to function therewith devoid of movement relative to its associated wall during movement of the shaft relative to the bit.

3. In a rock drill, a detachable bit comprising an axially holed relatively hard metal stock formed with an enlarged drilling or cutting end and a hardened and tempered taper socketed other or opposite smaller end adapted to receive the tapered end of an axially holed drill shaft and a relatively soft metal axially holed tapered comparatively thin liner of uniform thickness located non-extrudibly between the parts and integrally attached to the inner wall of said socketed end so as to be intimately allied thereto and to function therewith devoid of movement relative to its associated wall during movement of the shaft relative to the bit.

4. In a rock drill, a detachable bit comprising an axially holed relatively hard metal stock formed with an enlarged drilling or cutting end and a hardened and tempered taper socketed other or opposite smaller end adapted to receive the tapered end of an axially holed drill shaft and a relatively soft metal axially holed tapered comparatively thin liner of uniform thickness located non-extrudibly between the parts and electrolytically deposited upon the inner wall of said socketed end so as to be integrally attached thereto and to function therewith devoid of movement relative to its associated wall during movement of the shaft relative to the bit.

5. In a rock drill, a detachable bit comprising an axially holed relatively hard metal stock formed with an enlarged drilling or cutting end and a taper socketed other or opposite smaller end adapted to receive the tapered end of an axially holed drill shaft and a relatively soft metal axially holed taper liner of uniform thickness of approximately 0.005 inch located non-extrudibly between the parts and physically associated with the inner wall of said socketed end so as to be intimately allied thereto and to function therewith devoid of movement relative to its associated wall during movement of the shaft relative to the bit.

6. A metal blank for the detachable bit of a rock drill comprising an axially holed relatively hard metal stock having a butt end and a taper socketed other end, the inner wall of said socketed end having a layer of relatively soft and relatively thin metal electrolytically deposited thereon and integrally attached thereto.

7. A metal blank for the detachable bit of a rock drill comprising an axially holed relatively hard metal stock having a butt end and a hardened and tempered taper socketed other end, the inner wall of said socketed end having a layer of relatively soft and relatively thin metal electrolytically deposited thereon and integrally attached thereto.

REGINALD ASLINE BEDFORD.